2,867,643
PRODUCTION OF ALKYL ALUMINIUM HALIDES

Guenther Hamprecht, Limburgerhof, Pfalz, and Hubert Muehlbauer, Ludwigshafen (Rhine), Germany, assignors to Badische Anilin- & Soda-Fabrik Aktiengesellschaft, Ludwigshafen (Rhine), Germany No Drawing. Application October 17, 1956
Serial No. 616,368

Claims priority, application Germany October 19, 1955

13 Claims. (Cl. 260—448)

This invention relates to the production of alkyl aluminium halides.

We have found that alkyl aluminium halides are obtained in a simple manner by reacting a reducing metal with an aluminium halide and a dialkyl or alkylaryl ether.

Thus for example compounds of the general formula

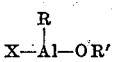

in which Al is aluminium, X is halogen, in particular chlorine, bromine or iodine, R is an alkyl radical and OR' is an alkoxy or aryloxy radical can be obtained by reacting one mole of aluminium halide, in particular aluminium chloride or aluminium bromide, at least 2 mols of a reducing metal, preferably aluminium, and 3 mols of ether. Other reducing metals which may be used are for example magnesium and zinc. All symmetrical and unsymmetrical dialkyl ethers may be used. The low molecular weight alkyl ethers are especially suitable, as for example dimethyl ether, methyl ethyl ether, methyl propyl ether, diethyl ether, di-normal-propyl ether or di-normal-butyl ether, i. e. especially ethers having alkyl groups which contain up to 4 carbon atoms, but those with higher molecular alkyl groups may also be suitable. Alkylaryl ethers, as for example anisol, para-methylanisol (methyl cresol ether), phenylethyl ether or also halogenated alkyl-aryl ethers, such as para-chloranisol, may also be used.

It is especially favorable to use, beyond the said 3 mols, further amounts of ether as solvent or diluent. Although it is preferable to use 2 mols of a reducing metal to 1 mol of aluminium halide, the relative proportions can be varied within wide limits, an excess of the metal having a specially favorable effect. The unused metal can be used for further reactions. Depending on the boiling point of the ether used, the reaction is carried out under normal or increased pressure, preferably up ot about 100 atmospheres. The reaction is preferably carried out at temperatures between about 100° and 220° C. When using lower aliphatic ethers, particularly suitable results may be obtained at about 150° to 170° C., and when using aromatic ethers, the reaction temperature is preferably higher.

It is possible to carry out the reaction in the presence of inert organic anhydrous liquids as diluents. Among these, there may be mentioned, for example, aromatic, and also in particular aliphatic or cycloaliphatic, hydrocarbons, or mixtures thereof.

A modification of the process which is often specially advantageous consists in starting from the etherates of the aluminium halides and reacting these with a reducing metal in the presence of either the same ether which is used in the form of its complex compound with aluminium halide, or preferably another dialkyl or alkylaryl ether. If the solid addition compound obtainable from 1 mol of an aluminium halide and 2 mols of a dialkyl ether is reacted with aluminium, then monoalkyl aluminium dihalides of the general formula R—Al—X$_2$ are obtained in which X is halogen, Al is aluminium and R is an alkyl radical, preferably of low molecular weight and in particular the methyl radical. It is preferable to use 1 mol of aluminium for 1 mol of the solid addition compound, but the aluminium may also be present in excess. The reaction preferably takes place at elevated temperature, in particular between about 50° and 150° C. At about 50° C., 1 mol of dimethyl ether is split off from the addition compound of 2 mols of dimethyl ether and 1 mol of aluminium halide. This 1 mol of dimethyl ether does not participate in the reaction and can be recovered. The monomethyl aluminium dihalide obtained can readily be purified, for example by vacuum distillation or sublimation. The reaction products are valuable polymerization catalysts, for example for the production of polymerization products from olefinically unsaturated compounds.

The following examples will further illustrate this invention but the invention is not restricted to these examples. The parts specified in the examples are parts by weight.

Example 1

40 parts of sublimed aluminium chloride, 20 parts of coarse aluminium powder and 150 parts of anhydrous diethyl ether are heated to 170° C. in an autoclave for 8 hours. A liquid is obtained from which the excess ether is removed by distillation at atmospheric pressure. The residual oily liquid is distilled in vacuo. It boils at 85° C. at 1 torr (one torr=$\frac{1}{760}$ atm.) and has the formula

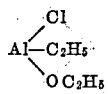

The yield is 95 parts.

Example 2

40 parts of sublimed aluminium chloride, 15 parts of magnesium chips and 150 parts of anhydrous diethyl ether are heated in an autoclave at 160° C. for 8 hours. A liquid is obtained from which the excess ether is removed by distillation. The residual viscous liquid is distilled in vacuo. It is identical with the compound obtained in Example 1. Yield: 52 parts.

Example 3

100 parts of aluminium chloride are dissolved in 220 parts of pure anhydrous di-normal-propyl ether while excluding moisture; then a further 520 parts of the same ether and 100 parts of aluminium are added and the whole heated for 10 hours at 160° C. in an autoclave. Then unreacted aluminium is filtered off in a current of nitrogen, the excess ether (530 parts) is distilled off in vacuo and the residue extracted with about 200 parts of dry pentane. The pentane extract is introduced under nitrogen into a distillation apparatus and the pentane removed by distillation. 200 parts (=60% of the theoretical yield) of a liquid organo-aluminium compound are obtained which has the formula

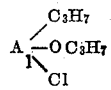

and which boils at 112° C. under 1.5 torr. The yield after a single distillation is 160 parts, equal to 48% of the theoretical yield.

Example 4

157 parts of methyl propyl ether are heated with 40 parts of aluminium chloride and 17 parts of coarse aluminium powder for 10 hours at 170° C. in an autoclave. After removal of the ether, the residue is extracted with pentane and the pentane distilled off. There remain 126 parts of crude product from which, by distillation at 70° C. under a pressure of 1.0 torr, the compound

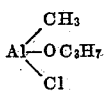

is isolated. The yield amounts to 76 parts, equal to 38.6% of the theoretical yield.

*Example 5*

250 parts of aluminium bromide are added portionwise to 870 parts of absolute diethyl ether while cooling with ice, 150 parts of aluminium coarse powder are added and the mixture is heated for 10 hours at 170° C. in an autoclave. The excess ether (470 parts) is removed by distillation. 400 parts (41% of the theoretical yield) of the compound

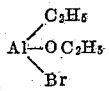

which boils at 96° C. under a pressure of 2 torr, are obtained.

*Example 6*

312 parts of aluminium chloride diethyl etherate are heated with 150 parts of aluminium and 736 parts of di-normal-propyl ether in an autoclave for 10 hours at 170° C. The excess ether is then distilled off. The alkyl alkoxy aluminium chloride obtained is separated by distillation (boiling point 70° to 155° C. at 15 torr). Besides ethyl ethoxy aluminium chloride, there is obtained

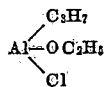

of the boiling point 115° to 120° C. at 2.0 torr. The yield amounts to 32%.

*Example 7*

300 parts of aluminium chloride dimethyl etherate and 200 parts of aluminium are added to 880 parts of di-normal-propyl ether and heated in an autoclave for 10 hours at 170° C. After distilling off the excess ether, the organo-aluminium compounds pass over at 80° to 112° C. at 1.5 torr. By fractionation there is obtained the compound

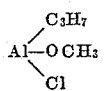

of the boiling point 112° C. at 1.5 torr. The yield amounts to 44%.

*Example 8*

46 parts of dimethyl ether are added to 133 parts of aluminium chloride while cooling. The resultant solid addition compound is mixed with 30 parts of coarse aluminium powder and heated. The mixture becomes liquid at about 50° C. It is then stirred and the temperature is raised to 120° to 130° C. After about 2 hours, the temperature is raised to 140° to 150° C. and the whole stirred for another 10 hours. A white crystallized compound of the composition $CH_3AlCl_2$ is obtained which can be distilled at 98° to 100° C. at a pressure of 100 torr. It melts at 70° C. and boils at 152° C. under normal pressure. It is spontaneously inflammable in the air.

*Example 9*

A mixture of 400 parts of anisol, 55 parts of aluminium chloride and 30 parts of coarse aluminium powder is heated for 20 hours to 150° C. away from air at superatmospheric pressure of 30 torr with stirring. After cooling the mixture, a solid product is obtained. From this the excess anisol is distilled off under normal pressure. Then the reaction product is distilled in vacuo at from 128° to 131° C. at 1 torr. The compound obtained has the formula

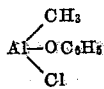

*Example 10*

4.2 parts of ethoxy ethyl aluminium chloride (prepared by reaction of 40 parts of anhydrous aluminium chloride, 20 parts of aluminium coarse powder and 150 parts of anhydrous diethyl ether at 170° C. with subsequent distillation of the excess ether) are dissolved in 280 parts of octane. Under an inert gas, 1 part of vanadium-4-chloride is added. The whole is stirred for 30 minutes at 40° C. and then into the resultant violet suspension, ethylene which has been purified from water and traces of oxygen is led in under normal pressure. The polymerization begins immediately. A pasty mass is formed which, after separation of the diluent, is washed with an aqueous methanolic solution of oxalic acid and then dried. 35 parts of pulverulent polyethylene are obtained. The intrinsic viscosity measured in tetraline (tetrahydronaphthalene) at 120° C. amounts to 7.9.

We claim:

1. A process for production of aluminium organic compounds selected from the group consisting of compounds of the general formula

and

in which X is a halogen with an atomic weight between 35 and 127, R is an alkyl group having 1–4 carbons, and $R_1$ is a hydrocarbon radical having 1–7 carbons, which process comprises reacting a reducing metal from the group consisting of aluminium, magnesium, and zinc with an aluminium halide, the halide having an atomic weight between 35 and 127, in the presence of an ether selected from the group consisting of ethers having the formulas R—O—R and R—O—$R_1$ in which R is an alkyl group having 1–4 carbons and $R_1$ is a hydrocarbon radical having 1–7 carbons.

2. The process of claim 1 wherein at least two mols of the reducing metal and at least three mols of the ether are present per mol of the aluminium halide.

3. The process of claim 2 wherein the amount of ether is substantially in excess of three mols per mol of the aluminium halide and thereby also serves as a diluent.

4. The process of claim 1 wherein at least a portion of the ether is present in the reaction mixture in the form of an addition compound with the aluminium halide.

5. The process of claim 1 wherein the ether is a dialkyl ether, and the reaction is carried out at a temperature between 150° C. and 170° C.

6. A process for production of aluminium organic compounds which comprises reacting an addition compound of one mol of an aluminium halide, the halide having an atomic weight between 35 and 127, and two mols of a dialkyl ether, the alkyl groups having 1–4 carbons, with at least one mol, per mol of the addition compound, of a reducing metal from the group consisting of aluminum, magnesium, and zinc in the presence of additional amounts of an ether having the formula R—O—$R_1$, wherein R is an alkyl group having 1–4 carbons and $R_1$ is a hydrocarbon radical having 1–7 carbons.

7. A process for production of aluminum organic compounds which comprises reacting an addition compound of one mol of an aluminum halide, the halide having an atomic weight between 35 and 127, and two mols of a dialkyl ether, the alkyl groups having 1–4 carbons, with at least one mol, per mol of the addition compound, of a reducing metal from the group consisting of aluminum, magnesium, and zinc.

8. The process of claim 7 wherein the addition compound is a complex of one mol of aluminum chloride and two mols of the dialkyl ether.

9. The process of claim 8 wherein the reaction is carried out at a temperature between 50° C. and 150° C.

10. The process of claim 1 wherein the reducing metal is aluminum.

11. The process of claim 1 wherein the reducing metal is magnesium.

12. The process of claim 1 wherein the reducing metal is zinc.

13. A compound of the formula

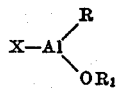

wherein X is a halogen having a molecular weight between 35 and 127, R is an alkyl radical having 1–4 carbons, and $R_1$ is a hydrocarbon radical having 1–7 carbons.

References Cited in the file of this patent

UNITED STATES PATENTS

| | | |
|---|---|---|
| 2,052,889 | Loder et al. | Sept. 1, 1936 |
| 2,271,956 | Ruthruff | Feb. 3, 1942 |
| 2,473,434 | Lindsey | June 14, 1949 |

OTHER REFERENCES

Sidgwick: Chemical Elements and Their Compounds, Oxford Univ. Press, 1951, London, vol. I, page 432.

UNITED STATES PATENT OFFICE
CERTIFICATE OF CORRECTION

Patent No. 2,867,643 January 6, 1959

Guenther Hamprecht et al.

It is hereby certified that error appears in the printed specification of the above numbered patent requiring correction and that the said Letters Patent should read as corrected below.

Column 2, line 60, Example 3, for that portion of the formula reading "$A_1$—$OC_3H_7$" read -- $Al$—$OC_3H_7$ --; column 4, line 35, claim 1, for "$R$—$al$—$X_2$" read -- $R$—$Al$—$X_2$ --.

Signed and sealed this 12th day of May 1959.

(SEAL)
Attest:

KARL H. AXLINE
Attesting Officer

ROBERT C. WATSON
Commissioner of Patents